United States Patent [19]

Fedrigo et al.

[11] 4,008,021
[45] Feb. 15, 1977

[54] APPARATUS FOR FORMING A SINTERABLE COMPACT OF A POWDER

[75] Inventors: Renzo Fedrigo, Banchette d'Ivrea (Turin); Bartolomeo Borrini, Ivrea (Turin); Vittorio Garattini, Lovere (Bergamo); Giovanni Pino, Banchette d'Ivrea (Turin), all of Italy

[73] Assignee: Schwelmer Eisenwerk Muller & Co. GmbH, Schwelm, Germany

[22] Filed: May 9, 1975

[21] Appl. No.: 576,117

Related U.S. Application Data

[60] Division of Ser. No. 272,584, July 17, 1972, abandoned, and a continuation of Ser. No. 390,137, Aug. 20, 1973, abandoned.

[30] Foreign Application Priority Data

Aug. 10, 1971 Italy .............................. 69685/71

[52] U.S. Cl. ......................... 425/3; 425/78; 425/174.8 E; 425/419; 425/421; 425/DIG. 33; 425/354; 72/430
[51] Int. Cl.² ...................................... B30B 11/02
[58] Field of Search ................. 425/3, 78, 174.8 R, 425/174.8 E, 419, 421, 422, DIG. 33; 72/430

[56] References Cited

UNITED STATES PATENTS

| | | | |
|---|---|---|---|
| 2,449,515 | 9/1948 | Seelig | 264/120 |
| 2,549,642 | 4/1951 | Seelig | 425/78 |
| 2,909,826 | 10/1959 | McElroy | 425/421 |
| 3,210,450 | 10/1965 | Bratton | 425/422 X |
| 3,584,496 | 6/1971 | Keller | 72/430 |
| 3,773,446 | 11/1973 | Borrini | 425/78 |

*Primary Examiner*—J. Howard Flint, Jr.
*Attorney, Agent, or Firm*—Karl F. Ross; Herbert Dubno

[57] ABSTRACT

An apparatus for forming a sinterable compact of a powder comprises a pair of respective shafts displaceable toward one another by the action of respective cams and serving to displace opposing ram members to compact a powder between them. Respective plates carrying the ram members are entrained with the shafts and are displaced in the opposite direction by respective pairs of pneumatic cylinders. The rams are thereupon displaced at high rate against the precompacted powder by energizing a disk-shaped coil which repels electrodynamically the plate carrying the rams.

2 Claims, 8 Drawing Figures

APPARATUS FOR FORMING A SINTERABLE COMPACT OF A POWDER

CROSS-REFERENCE TO RELATED APPLICATIONS

This application is a continuation of Ser. No. 390,137, filed 20 Aug. 1973 now abandoned, as a division of application Ser. No. 272,584 of 17 July 1972 (now abandoned). The application also relates to Ser. No. 180,349 filed 14 Sept. 1971 (U.S. Pat. No. 3,695,130) which was a continuation-in-part of Ser. No. 869,059 of 24 Oct. 1969 (abandoned). The application also relates to U.S. Pat. No. 3,730,039, the application for which was copending with the parent case hereof.

BACKGROUND OF THE INVENTION

The present invention relates to apparatus for compacting powdered materials preparatory to sintering.

The compacting of pieces to be sintered is generally effected by means of presses which compact the powder at a relatively low speed. These presses operate by applying force to their rams of a magnitude great enough to compact the powder to a sufficiently high density so that the piece to be sintered may have acceptable strength. The magnitude of the force required for compacting the powder varies directly with the cross sectional area and height of the part to be produced.

These requirements therefore demand presses which, on the one hand, are capable of exerting enormous pressures on their rams and, on the other hand, are proportioned to the dimensions of the pieces to be sintered. Therefore, to produce compacts of different sizes a whole range of presses is needed, the installation of which requires an enormous capital investment and the use of which is often limited.

Moreover, with the known presses, both cam-actuated and hydraulically actuated, it is generally not possible in a single compacting operation to exceed a density of about 6.7 kg/dm$^3$ in the case of iron powder. This density is generally insufficient for pieces which must withstand high stresses or frequent or violent shocks so that it is often necessary after sintering to coin the parts.

SUMMARY OF THE INVENTION

According to the present invention, there is provided apparatus for compacting powdered metal materials in which a die is filled with a predetermined amount of the powdered material and a ram, which enters the die from one side thereof, is driven against the powder for compacting it to a first density. Thereafter, the ram is withdrawn by a predetermined amount from said compacted powder and then hurled at high speed back against the compacted powder material for further compacting the powdered material to a second density considerably higher than the first density. The part formed by the further compacted powdered material is then ejected from the die. The hurling of the ram back against the compacted powder is accomplished in the preferred embodiment of the present invention by means of the repulsive force generated between a flat coil and a planar conductive element mounted on the ram adjacent to the coil when the coil is energized with a pulse of electrical energy.

BRIEF DESCRIPTION OF THE DRAWINGS

The invention will now be described with reference to a number of preferred embodiments of presses and with reference to the accompanying drawings, in which.

DETAILED DESCRIPTION

Figure 1:
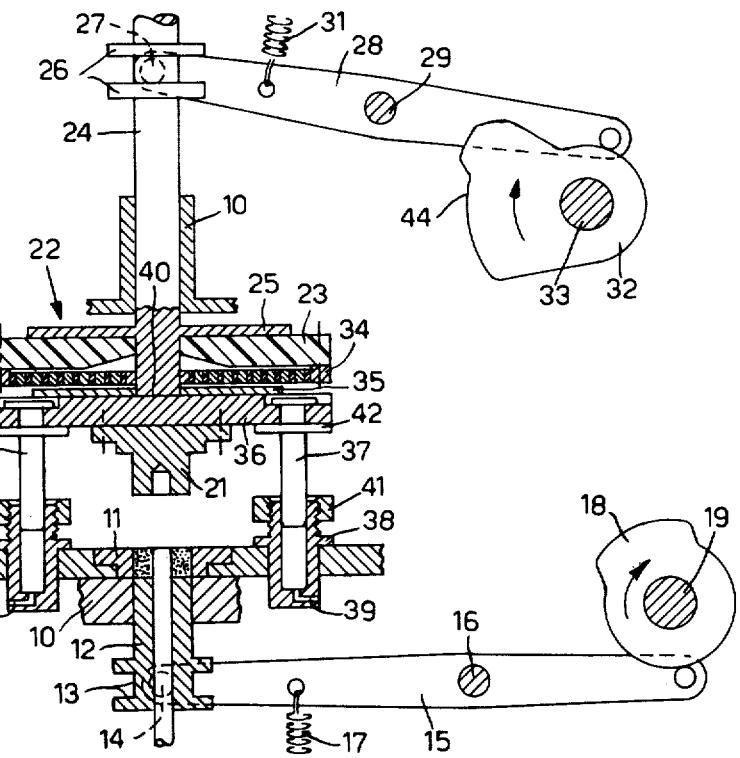
FIG. 1 is a partial median section of a compacting press according to a first embodiment of the invention.

Referring now to FIG. 1, the reference 10 indicates generally the fixed frame of a compacting press. On the frame 10 there is fixed in known manner a die 11 for molding generally prismatic parts, for example cylindrical parts. The die 11 is closed at the bottom by a ram 12 which is movable vertically upwards on the frame 10. The ram 12 has a groove 13 in which there is engaged a pin 14 of a lever 15. This lever is pivoted on a fixed pin 16 and normally bears by the action of a spring 17 against a cam 18. This cam is fixed on a shaft 19 actuating the press. Shaft 19 is rotated clockwise through 360° once for each compacting cycle.

A ram 21 having the same cross section as the part to be compacted is mounted for vertical movement in the frame 10 of the press and cooperates with the die 11. More particularly, the ram 21 is carried by a structure indicated generally by the reference 22 and comprising a plate 23 affixed to a flange 25 of a rod 24 which is guided vertically in the frame 10 of the press. The rod 24 is provided with a pair of flanges 26 between which there is engaged a pin 27 of a lever 28. This lever is pivoted on a fixed spindle 29 and normally bears by the action of a spring 31 against a cam 32 on a second shaft 32 which is rotatable clockwise cyclically in synchronism with the shaft 19.

Between the ram 21 and the structure 22 there is disposed an electrodynamic unit comprising a coil 34 constituted by a conductor of substantially rectangular cross section, wound in a spiral and fixed to the plate 23. The electrodynamic unit also includes a plate 35 of nonmagnetic, but electrically conductive, material, for example ergal alloy consisting of copper and aluminum, which is arranged at a short distance from the coil 34. The plate 35 is fixed to a steel plate 36 on which the punch 21 may be mounted by means of bolts.

Figure 8:
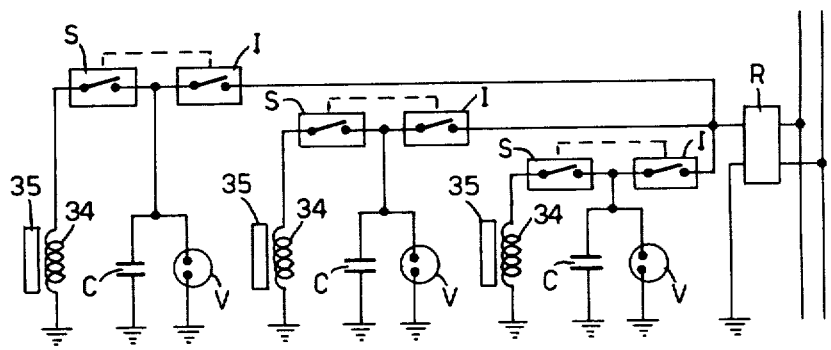
FIG. 8 is a circuit diagram of the electrodynamic unit controlling the punches.
Figure 2:
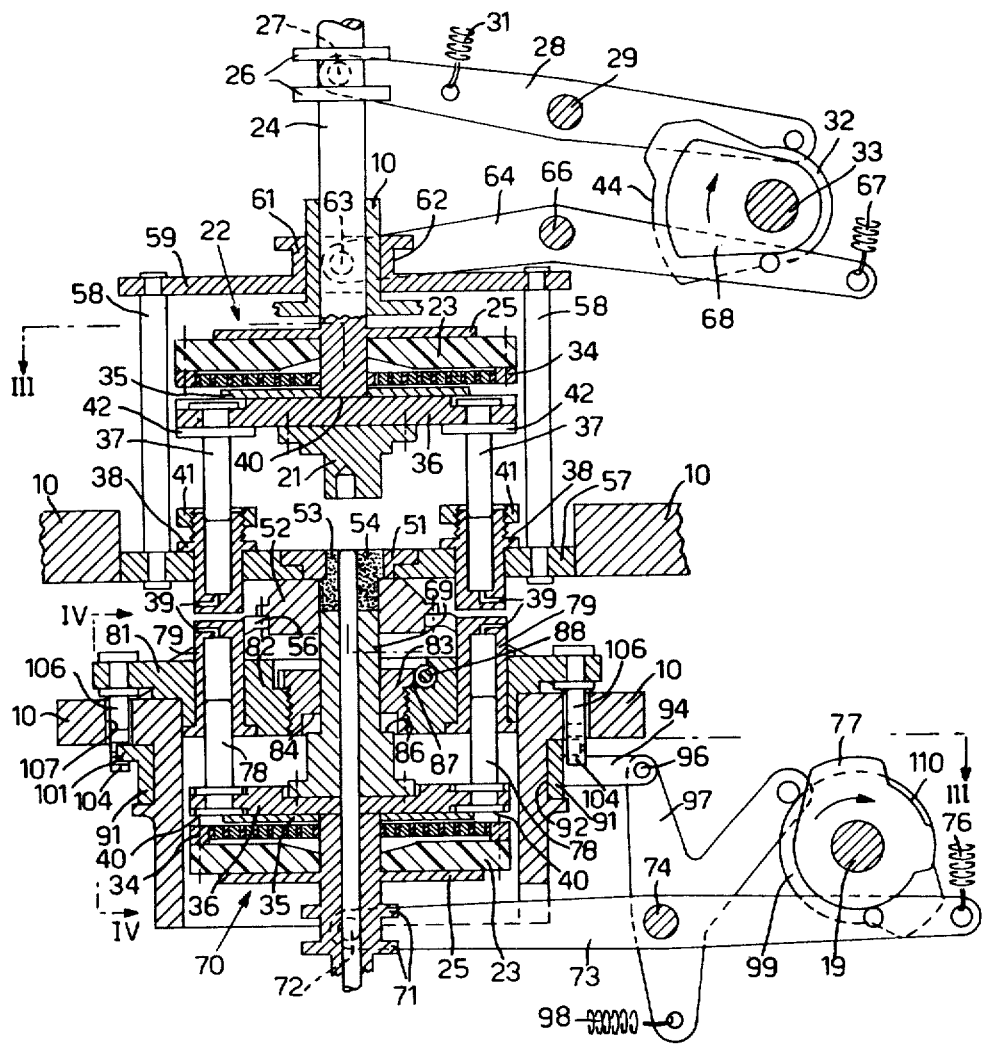
FIG. 2 is a median section of a second embodiment of the press of the invention.

The coil 34 (FIG. 8) is electrically connected to a corresponding capacitor $C_1$ through a switch $S_1$. This switch is closed at a predetermined instant of the compacting cycle in manner known per se. The capacitor is recharged at each cycle by means of a rectifier R and another switch $I_1$ which is closed under the control of a voltmeter $V_1$ after each discharge of the capacitor C.

On the plate 36 (FIG. 1) there are fixed two columns 37 guided by two bushings 38 fixed to the frame 10.

Each bushing 38 is closed at the bottom and is provided with a duct 39 to which air under pressure can be delivered so as to hold the plate 36 in the high position, as shown in FIG. 1, against the bottom surface 40 of the rod 24. Each bushing 38 is threaded externally and cooperates with adjustable stop means constituted by a nut 41 which arests a flange 42 of the corresponding column 37.

The press of FIG. 1 operates in the following manner.

At the beginning of the cycle of the shafts 19 and 33, the structure 22 is in the high position, while the punch 12 closes the die 11 at the bottom. Moreover, the compressed air holds the plate 36 and the punch 21 in the high position against the surface 40. By means of an articulated conduit not visible in the drawings, the die 11 is first filled with the iron powder, as shown in FIG. 1, after which the conduit is brought out of the path of the punch 21. Thereafter, shaft 33 begins to rotate and causes the cam 32 to turn the lever 28 in the counter-clockwise direction in opposition to the action of the spring 31. Through the medium of the rod 24, the pin 27 drives the structure 22 downwardly together with the coil 34 and through the medium of the surface 40 the structure 22 carries the plate 36 along downwardly against the action of the compressed air.

The punch 21 thus effects a first compression of the powder in the die 11 until it causes the part to attain a predetermined density which is in general less than 6 kg/dm$^3$ but is such as to impart sufficient cohesion to the part.

Thereafter, by means of a depression 44, the cam 32 allows the spring 31 assisted by the compressed air in the bushings 38 to raise the electrodynamic unit together with the structure 22 until the punch 21 is brought to a distance of about 5 mm from the upper surface of the piece formed in this way. The switch $S_1$ (FIG. 8) is then closed and causes a discharge of the capacitor $C_1$ in the manner described in the U.S. Pat. application Ser. No. 180,349 filed on Sept. 14, 1971 (U.S. Pat. No. 3,695,130, commonly owned); which is hereby included by reference. This discharge is transmitted to the coil 34 (FIG. 1), which produces a very high repulsive electrodynamic force on the plate 35. Plate 35 is thereby hurled downwardly at high speed together with the plate 36 and the punch 21. The punch 21 thus rapidly acquires a high kinetic energy and strikes against the precompressed powder to effect the final compression. The stroke of the punch 21 continues until the flanges 42 are arrested against the nuts 41 at the predetermined dimensions of the piece. Because of the high speed of the punch and the relative density of the compressed powder, the action of the punch 21 is immediately transmitted to all points of the piece, the density of which is therefore satisfactorily uniform and reaches for iron, a value greater than 7 kg/dm$^3$.

Finally, the cam 32 allows the spring 31 to bring the structure 22 back to the high position. The structure is followed by the punch 21, which is urged upwardly together with the plates 35 and 36 by the compressed air entering through the ducts 39. In turn, the cam 18, acting through the lever 15, drives the punch 12 upwardly to effect the ejection of the compacted part through the top of the die 11.

The compacting method thus is performed by first filling the die 11 with metal powder and then actuating the punch 21 to compress the powder in the die 11 at a relatively slow rate, similar to that of the traditional mechanical or hydraulic powdered metal presses, so as to cause a predetermined density to be reached. The punch 21 is then partially retracted, for instance by a distance of 5 mm, from the compacted powder and then hurled back against the powder with a very high kinetic energy such as to compress the powder further until it reaches a final density considerably greater than the predetermined density.

A second embodiment of the invention, illustrated in FIGS. 2 through 5 of the drawings, involves a press having a die composed of two portions 51 and 52 (FIG. 2) which can compact parts constituted by two generally prismatic portions 53 and 54 (FIG. 6) of different cross sections, each portion 53, 54 being formed in the corresponding portion 51, 52 of the die.

The portion 53 is compacted by a punch identical to the punch 21 described with reference to FIG. 1, so that the parts identical to those of FIG. 1 are indicated here by the same reference number and are not described in detail.

The die portion 52 is fixed to a frustoconical part 56 of the frame 10 of the press. The die portion 51, in turn, is carried by a plate 57 slidable vertically on the frame 10. The plate 57 is fixed by means of columns 58 to a second plate 59 which is also slidable on the frame 10 by means of a sleeve 61 integral with the plate 59. The sleeve 61 has a groove 62 which is engaged by a pin 63 of a lever 64. This lever is pivoted on a spindle 66 and cooperates through the action of a spring 67 with another cam 68 of the shaft 33.

With the lower portion 52 of the die there cooperates a lower punch 69 movable in the opposite direction to the upper punch 21 and normally disposed in such manner as to close the die portion 52 at the bottom. The punch 69 is carried by a structure 70 similar to the structure 22 and therefore comprising another coil 34 fixed on the structure 70 and another plate 35 of conductive material connected to a plate 36 to which the punch 69 is fixed. The structure 70 is provided with two flanges 71 between which is engaged a pin 72 of a lever 73 pivoted on a fixed spindle 74 and cooperating through the action of a spring 76 with a cam 77 of the shaft 19. Each of the two coils 34 is now connected to a corresponding capacitor C (FIG. 8), the different capacitors C being connected to corresponding switches S and I which are controlled individually.

On the plate 36 (FIG. 2) of the punch 69 there are fixed two columns 78 guided in two bushings 79 similar to the bushings 38. The bushings 79 are fixed to a plate 81 normally locked to the frame 10 of the press in the manner which will be described hereinafter. The plate 81 is provided with a threaded hole 82 in which there is disposed an adjustable stop means for the lower punch 69. More particularly, this stop means is constituted by an externally threaded sleeve 83 provided with a recess 84 which arrests a shoulder 86 of the punch 69. The sleeve 83 is integral with a worm wheel 87 in mesh with a worm 88 rotatable in the plate 81. A manual adjusting crank 89 is attached to the worm 88 (see also FIG. 3).

The plate 81 is fixed to the frame 10 by means of positive locking means comprising a ring 91 rotatable in a groove 92 in the press frame 10. The ring 91 is provided with a pin 93 (FIG. 3) connected with a large amount of play to a hole in a slider 94. This slider is pivoted on a pin 96 carried by a lever 97 (FIG. 2) pivoted on the spindle 74. The lever 97 is adapted to cooperate by the action of a spring 98 with a cam 99 of the shaft 19.

Figure 3:
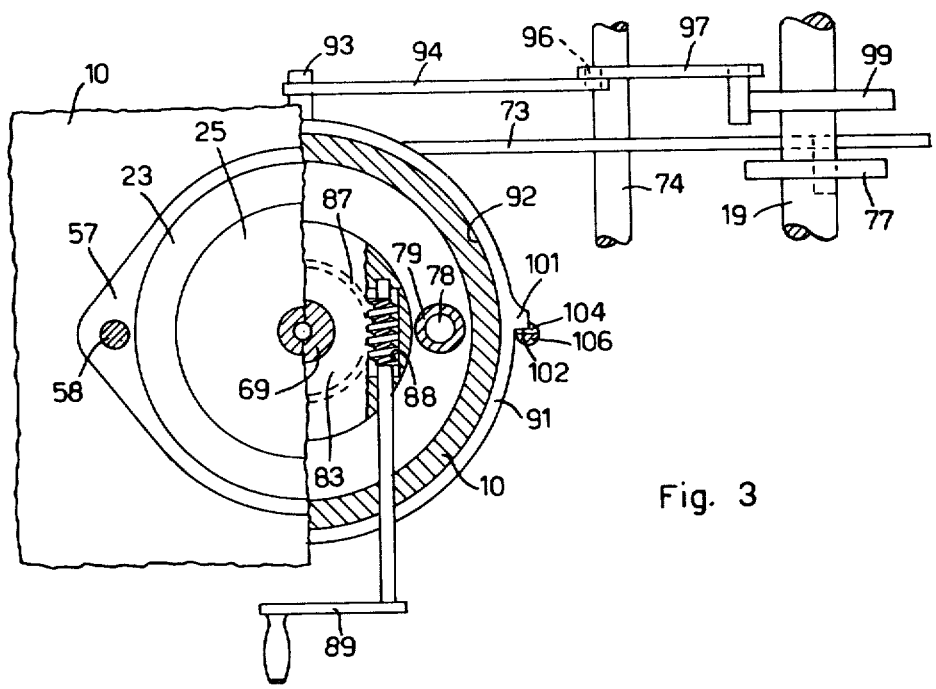
FIG. 3 is a partial plan view of the press on the line III—III of FIG. 2.
Figure 4:
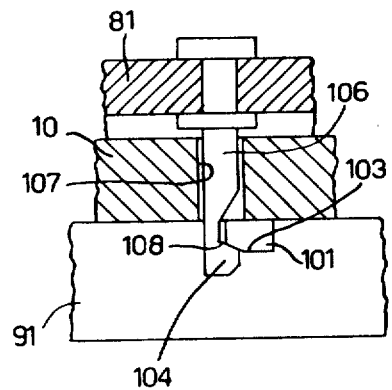
FIG. 4 is a partial side view on a larger scale of a detail of the press on the line IV—IV of FIG. 2.

The ring 91 is moreover provided with two diametrically opposite teeth 101 (FIG. 3) each having a radial lip 102 and a slightly inclined bottom surface 103 (FIG. 4). Each tooth 101 cooperates with a hook-like projection 104 (FIG. 2) of a corresponding column 106 extending through a hole 107 in the frame 10 and fixed to the plate 81. The projection 104 (FIG. 4) is provided with an upper shoulder 108 inclined substantially like the bottom surface 103 of the tooth 101.

At rest, the two die portions 51 and 52 (FIG. 2) are in contact with one another, while the cam 99 holds the teeth 101 of the ring 91 positively engaged with the columns 106 through the medium of the lever 97 and the slider 94. At the beginning of the cycle, the die portions 51 and 52 are filled with powder as indicated in the drawing in the same manner as has been described for the press of FIG. 1. Through the levers 28 and 73, the cams 32 and 77 then drive the two structures 22 and 70 toward one another so as to effect the precompacting of the powder by means of the punches 21 and 69.

Figure 5:
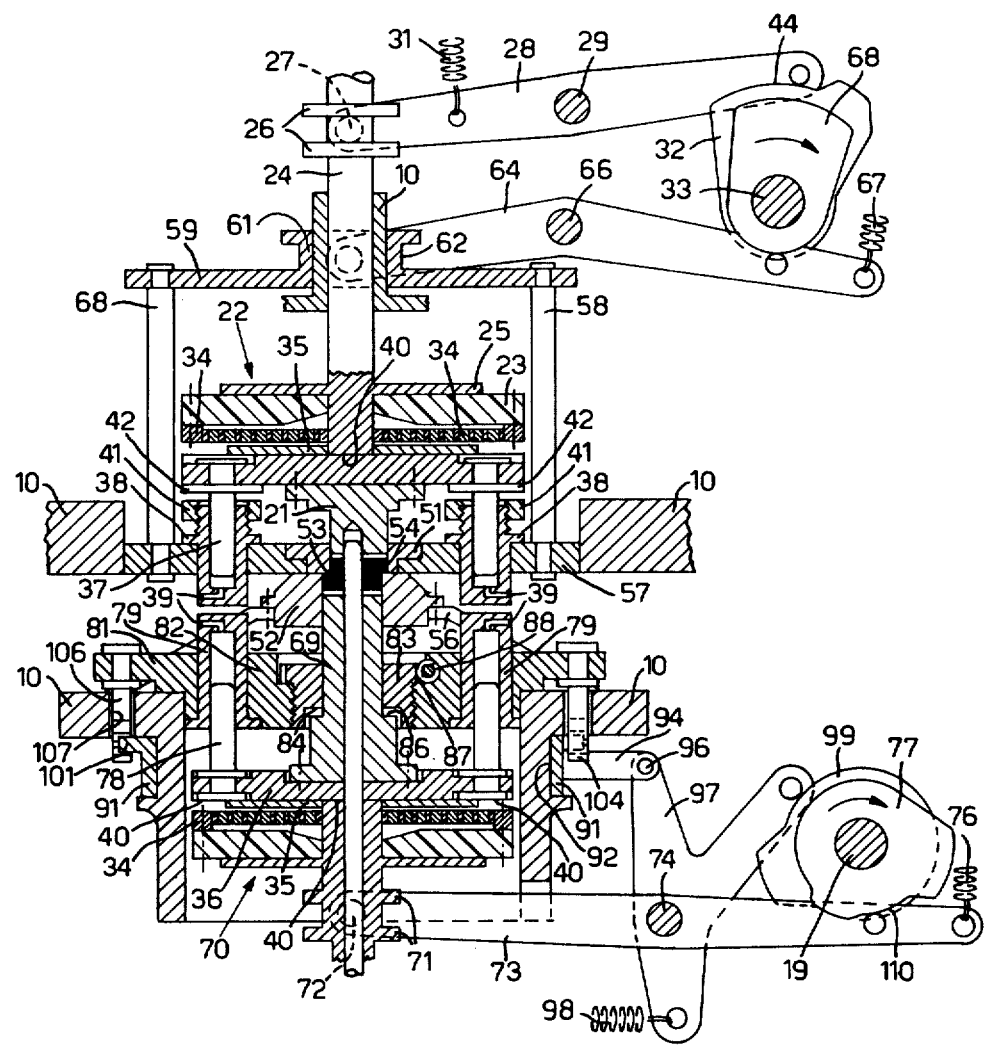
FIG. 5 is the section of FIG. 2 in a first working position.

Thereafter, the two depressions 44 and 110 of the cams 32 and 77 allow the spring 31 and 76 to move structures 70 and 22 away from the die portions 51 and 52 for a predetermined stroke or distance, as a result of which the press reaches the configuration illustrated in FIG. 5. Because of the precompacting, the part has by this time a sufficient cohesion, so that the moving away of the lower punch 69 does not damage the part.

The capacitors C (FIG. 8) are now discharged through the two coils 34, substantially simultaneously, and the currents in the coils 34 produce a very large repulsive force in the plates 36. This repulsive force drives the punches 21 and 69 toward the part with a high kinetic energy, as a result of which the two punches 21 and 69 effect the final compacting of the piece by acting thereon from opposite sides. The upper punch 21 is arrested with the flanges 42 on the nuts 41, while the lower punch 69 is arrested with the shoulder 86 against the recess 84 in the sleeve 83, so that the piece is compacted to the size that has been fixed.

Figure 6:
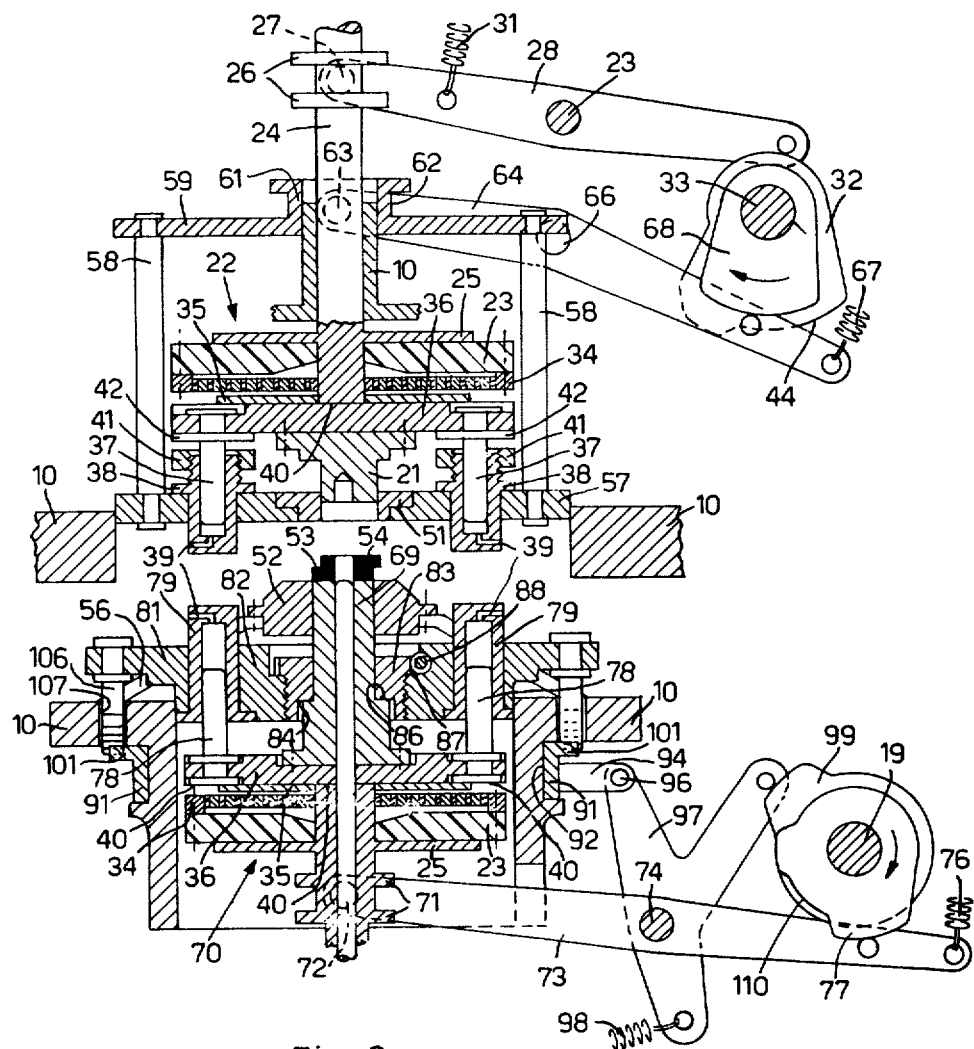
FIG. 6 is the section of FIG. 2 in another working position.

The cam 32 now allows the spring 31 to bring the structure 22 back upwardly, this structure being followed by the punch 21, while the cam 68, through the medium of the lever 64, the plate 59 and the columns 58, shifts the plate 57 upwardly together with the die portion 51. Immediately afterwards, the cam 99, acting through the lever 97 and the slider 94, causes the ring 91 (FIG. 3) to turn counterclockwise, disengaging the teeth 101 from the projections 104 of the columns 106, as a result of which the plate 81 is free to move upwardly. The cam 77, acting through the lever 73 now shifts the structure 70 further upwards together with the lower punch 69, the sleeve 83 and the plate 81, so that the piece formed is carried into the space between the two die portions 51 and 52, as shown in FIG. 6, and can be removed from the press.

The cams 68, 77 now bring the upper die portion 51 and the lower punch 69 back into the inoperative position. Finally, through the medium of the lever 97 and the slider 94 the cam 99 brings the ring 91 into the position of FIG. 3, once more locking the plate 81 to the frame 10 of the press.

It is therefore obvious that at least the punch 69 is moved for a supplementary stroke after both the punches 21, 69 have been hurled against the die 51, 52 in order to eject the part, and that the corresponding stop 83 is shifted together with the lower punch 69 during the supplementary stroke.

Figure 7:
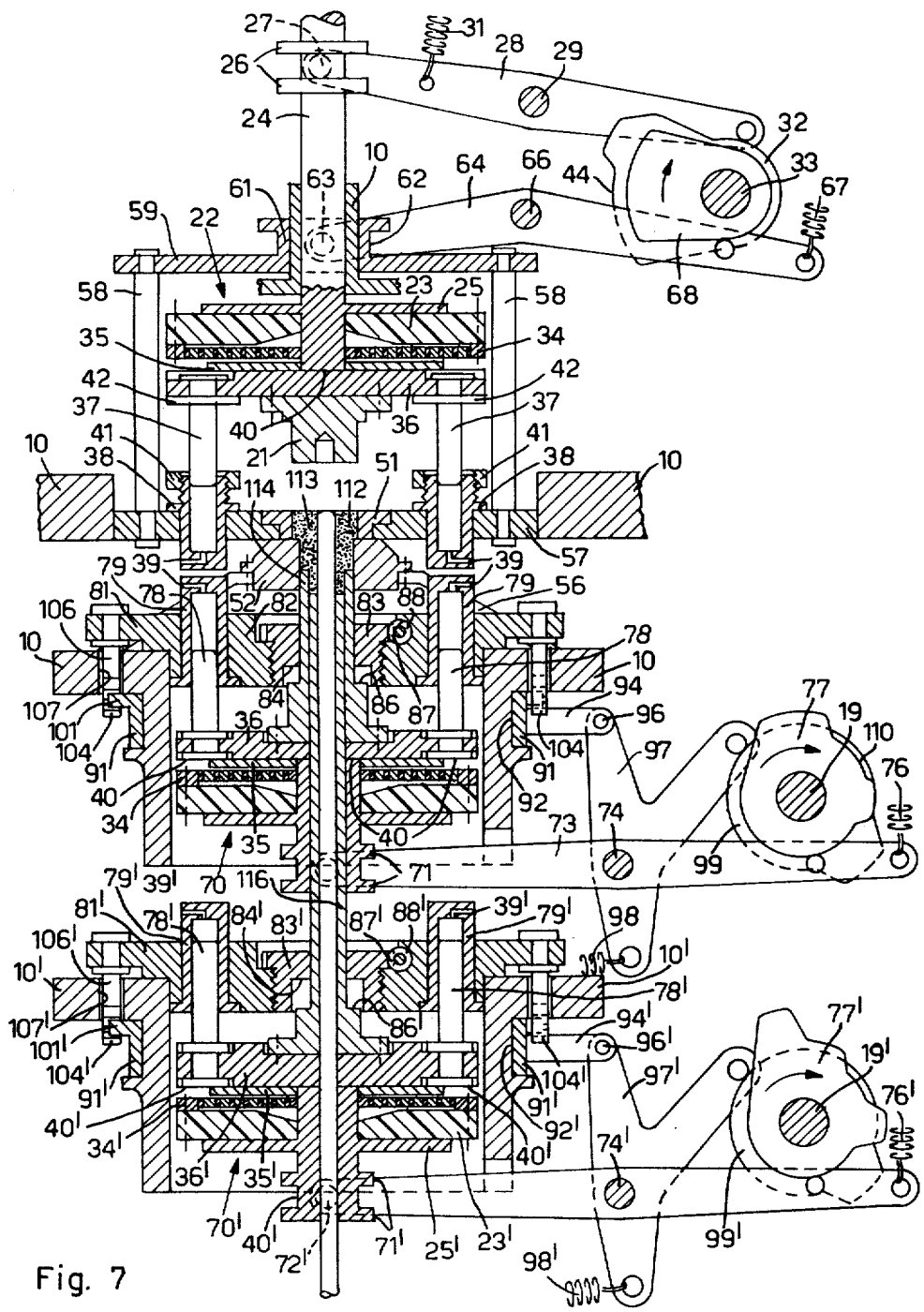
FIG. 7 is a median section of a third embodiment of the invention.

According to a third embodiment of the invention, the lower portion 52 of the die forms a portion of the part constituted by two sections 112 and 113 (FIG. 7), the section 113 having a cross section contained within the cross section of the section 112. The lower sections 112 and 113 can be formed by means of two nested punches 114 and 116 movable coaxially one with respect to the other. More particularly, the punch 114, which compresses the section 112 of the part, is hollow and is carried by the structure 70, while the punch 116, which compresses the section 113 of the part slides inside the punch 114 and is carried by a structure 70' identical to the structure 70. The various parts of the structure 70' corresponding to the punch 116 are indicated in FIG. 7 by the same reference numbers as those of the structure 70 corresponding to the punch 114, but furnished with a prime. The sleeve 83' must be adjusted in this case in such manner as to allow the inner lower punch 116 a stroke greater than that of the outer lower punch 114, the low-speed strokes of the punches being required to be proportional to the thickness of the portions to be compressed.

During the precompression, the punches 114, 116 are moved in this instance for a proportional stroke through the agency of the respective cams 77, 77' and are thereafter moved away from the part by a predetermined stroke or distance. The coils 34 of the structures 70, 70' are then energized substantially simultaneously so as to hurl the respective plates 36 upwardly until the punches 114 and 116 are arrested with the shoulders 86, 86' against the sleeves 83, 83', in a similar manner to that described hereinbefore.

After the upward shifting of the die portion 51 and the punch 21, the action of the cams 99, 99' releases the rings 91, 91' from the columns 106, 106'. The cams 77, 77' then drive the punches 114 and 116 upwardly in such manner as to align the ends of the two punches 114 and 116 with the upper surface of the die portion 52, so that the part is ejected from the top of the lower die portion 52 and can be removed from the press in the space between the two die portions 51, 52.

It is understood that various improvements and additions of parts may be made in the compacting method described and in the presses carrying the same into effect and hereinbefore described without departing from the scope thereof. For example, the various structures, 22, 70, 70' may be actuated hydraulically instead of by means of cams, or the structures 70, 70' may be interconnected in such manner as to carry one another along reciprocally. Moreover, the capacitors C may be of different values and charged to different voltages from one another and may be discharged with suitable phase differences between them so as to compact one part of the piece at a time by means of the electrodynamic unit. In this case, during the action of the electrodynamic unit, the opposed punch or punches are kept in contact with the piece to sustain the impact due to the electrodynamic action.

Furthermore, it should be apparent that a lower punch structure similar to that described in relation to the embodiments of FIG. 3 and FIG. 7 of the drawings could be incorporated with the embodiment of the invention illustrated in FIG. 1 of the drawings in which the press has a unitary die.

What is claimed is:

1. An apparatus for forming a sinterable compact of a powder comprising:
   a support;
   a die on said support for receiving a mass of powder to be compacted;
   respective rams juxtaposed with said mass on opposite sides thereof and displaceable relative to said die to compact said mass between them;
   respective plates on opposite sides of said die each carrying a respective one of said rams;
   respective pairs of pneumatic cylinders interposed between said support and each of said plates, said cylinders being pressurizable to displace said plates away from said support;
   respective shafts displaceable on said support toward and away from said die, each of said shafts being engageable with a respective one of said plates to entrain the same toward said mass upon displacement of the respective shafts;
   respective flat coils carried by said shafts and lying in planes parallel to but spaced from the respective plates, said coils being impulsively electrically energizable to electrodynamically repel the respective plates and drive said rams at a high speed against said mass; and
   respective cam means for displacing said shafts toward said die to precompact the mass by entrainment of the plates and the rams with said shafts for compaction of said mass to a low density whereby said pneumatic cylinders thereupon move said plates away from said die and into proximity of said coils for electrodynamic displacement thereby.

2. The apparatus defined in claim 1, further comprising adjustable means for arresting each of said ram upon the displacement thereof by said coil through a predetermined stroke.

* * * * *